United States Patent [19]

Ward et al.

[11] Patent Number: 4,831,071
[45] Date of Patent: * May 16, 1989

[54] ENHANCED MELT EXTRUSION OF THERMOPLASTICS CONTAINING SILICONE INTERPENETRATING POLYMER NETWORKS

[75] Inventors: Susan K. Ward, Phoenixville; Gregory S. O'Brien, Malvern, both of Pa.

[73] Assignee: ICI Americas Inc., Wilmington, Del.

[ * ] Notice: The portion of the term of this patent subsequent to Sep. 22, 2004 has been disclaimed.

[21] Appl. No.: 99,185

[22] Filed: Sep. 21, 1987

[51] Int. Cl.$^4$ .................. C08L 83/00; C08L 77/00; C08K 7/14; C08K 7/06
[52] U.S. Cl. .................... 524/401; 524/439; 524/440; 524/441; 524/500; 524/537; 524/538; 524/539; 524/540; 524/542; 524/861; 524/862; 524/866; 525/100; 525/104; 525/106; 525/422; 525/425; 525/427; 525/431; 525/426; 525/903
[58] Field of Search ............... 524/439, 538, 500, 537, 524/539, 540, 542, 861, 862, 866, 401, 440, 441; 525/100, 104, 106, 422, 425, 427, 431, 426, 903; 264/209.3, 209.5, 210.1

[56] References Cited

U.S. PATENT DOCUMENTS

| | | | |
|---|---|---|---|
| 4,157,235 | 6/1979 | Lagabe et al. | 264/209.5 |
| 4,250,074 | 2/1981 | Foscante et al. | 525/903 |
| 4,302,553 | 11/1981 | Frisch et al. | 525/28 |
| 4,468,499 | 8/1984 | Siegfried et al. | 525/301 |
| 4,472,556 | 9/1984 | Lipowitz et al. | 525/106 |
| 4,481,158 | 11/1984 | Georlette et al. | 264/210.1 |
| 4,500,688 | 2/1985 | Arkles | 525/431 |
| 4,659,534 | 4/1987 | Matsubayashi et al. | 264/209.5 |
| 4,695,602 | 9/1987 | Crosby et al. | 524/439 |
| 4,714,739 | 12/1987 | Arkles | 525/101 |

*Primary Examiner*—Lewis T. Jacobs
*Attorney, Agent, or Firm*—Panitch, Schwarze, Jacobs and Nadel

[57] ABSTRACT

High modulus thermoplastic compositions and composites are produced which exhibit enhanced melt integrity and strength, allowing the composites to be melt-drawn to smooth surfaced, high tolerance profiles, such as thin-walled tubing, wire, coatings, films, etc. The melt integrity is improved by adding to the thermoplastic prior to or during thermoplastic melt processing a silicone component which will be vulcanized within the thermoplastic to form a silicone semi-interpenetrating polymer network initiated during the melt processing of the thermoplastic. The composition contains about 0.1 to 20, and preferably about 1 to 4 weight percent of the silicone network, and may also contain fibrous reinforcement and/or filler/modifiers.

21 Claims, No Drawings

ENHANCED MELT EXTRUSION OF THERMOPLASTICS CONTAINING SILICONE INTERPENETRATING POLYMER NETWORKS

FIELD OF THE INVENTION

The present invention relates to fiber reinforced and unreinforced thermoplastics which are modified to improve melt processability and surface appearance. More particularly, the invention relates to unreinforced and fiber reinforced thermoplastic composites modified with silicone interpenetrating polymer networks.

BACKGROUND OF THE INVENTION

Profile extrusion of thermoplastics is often difficult due to the poor melt integrity of the thermoplastics. This is particularly a problem in extruded profiles of internally lubricated thermoplastic composites which exhibit poor surface appearance.

In the past several years, Petrarch Systems Inc. of Bristol, Pa. has developed a new class of melt processable thermoplastics which contain silicone interpenetrating polymer networks (IPN's). The compositions are sometimes referred to as semi-interpenetrating polymer networks (pseudo- or semi-IPN's) since only the silicone component is vulcanized or cross-linked in the thermoplastic matrix. The interpenetrating polymer network is formed by vulcanizing a hydride functional silicone group and a polymer containing at least one unsaturated group, preferably a vinyl group, during normal thermoplastic melt processing. See U.S. Pat. No. 4,500,688, issued Feb. 19, 1987, and Barry C. Arkles, U.S. Pat. No. 4,714,739, issued Dec. 22, 1987.

The pseudo- or semi-IPN's have the advantages of exhibiting surface and di-electric properties which approach those of silicones and mechanical properties which approach those of the thermoplastic matrix. In many cases, properties such as wear, lubricity and heat and abrasion resistance of the thermoplastics are improved. While this technology was originally developed in polyurethane systems, it has been extended to other thermoplastic elastomers and engineering thermoplastics. For example, U.S. Pat. No. 4,714,739, assigned to Petrarch Systems Inc. discloses that polyamide (nylon) and polyester engineering thermoplastics have been formulated into materials which appear to be particularly well suited for gear and bearing applications, with the heat distortion temperature of nylon 6,6 being increased by the incorporation of 5 wt % silicone IPN.

However, the major uses of silicone IPN's have still been in the modification of lower modulus thermoplastics, particularly elastomers. To applicants' knowledge, the silicone IPN's have not been used or recognized to improve melt integrity characteristics of high modulus thermoplastic materials, i.e., thermoplastic materials which in the unfilled state have a flexural modulus greater than 90,000 psi, as measured by ASTM D790.

BRIEF SUMMARY OF THE INVENTION

The compositions of the present invention are melt processable, fiber reinforced or unreinforced, high modulus (unfilled flexural modulus greater than 90,000 psi) thermoplastics which contain a silicone component which will form semi-interpenetrating polymer networks within the thermoplastic matrix. Preferably, the compositions of the invention are crystalline thermoplastic materials which are drawn in the melt state from a thick cross section leaving the extruder to a relatively thin cross section, self-supporting final product, such as in the manufacture of tubing, wire, coatings and films from polyolefins, nylons and melt processable fluoropolymers.

The silicone component is vulcanized by the reaction of a hydride-containing silicone, with the vulcanization reaction being initiated during thermoplastic melt processing of the silicone component and thermoplastic matrix. The silicone component comprises about 0.1 to 20 weight percent of the total composition, and the hydride group-containing silicone is reacted with a polymer containing at least one unsaturated group, preferably a vinyl group, which may be on a silicone or other polymeric compound.

Composites produced from the compositions of the invention exhibit enhanced melt strength compared to conventional fiber reinforced and unreinforced and/or particulate-filled thermoplastics without the silicone interpenetrating polymer network. This increase in melt strength allows the compounds to be melt-drawn to smooth surfaced, high tolerance profiles such as thin-walled tubing.

DETAILED DESCRIPTION OF THE PREFERRED EMBODIMENTS

The fiber reinforced and unreinforced thermoplastics to which the present invention is directed are generally those of the type which are referred to as engineering plastics, namely plastics with high mechanical properties, including high impact strength, high flexural modulus and high heat distortion temperatures. In general, these engineering materials include the main classes of crystalline thermoplastics (i.e., polyamides (nylons), polyesters, polyolefins, polyacetals and fluoropolymers).

The thermoplastic resins which are used in the present invention may be conveniently referred to as high modulus thermoplastics, i.e., those having a high flexural modulus. As used herein the term "high modulus" refers to a flexural modulus of the unfilled thermoplastic resin greater than 90,000 psi, as measured by ASTM specification No. D790. Of course, the flexural modulus of the fiber reinforced high modulus thermoplastics will range to psi's in the hundreds of thousands or millions.

The high modulus thermoplastic resins which may be used as matrix materials in the present invention include, but are not limited to polyamides, polycarbonates, styrenics (i.e., the styrene plastics family including polystyrene and high modulus copolymers thereof such as styreneacrylonitrile (SAN), acrylonitrile-styrenebutadiene copolymers (ABS), etc.), polyacetals, polyolefins, polyesters, polysulfones, polyphenylene sulfides, fluoropolymers (e.g., fluorinated ethylene-propylene copolymer (FEP), perfluoroalkoxy tetrafluoroethylene (PFA), ethylenetetrafluoroethylene (ETFE), polyvinylidene fluroride (PVDF), ethylene-chlorotrifluoroethylene ECTFE), etc.), polyetherimides, polyether ketones (including PEEK and others), polyacrylics, polyamide-imides, and polyvinyl chloride. These high modulus thermoplastics are to be distinguished from the relatively low modulus thermoplastic polyurethanes, polyolefin elastomers, polyamidepolyether elastomer base resins, polyester elastomers, etc.

The fibrous reinforcing agents that may be used to reinforce the thermoplastic matrix materials of the present invention include a wide variety of fiber types, including glass, carbon, organic (including aramid and the like), ceramic, boron, metal, and reinforcing mineral fibers, such as processed mineral fibers (PMF). The fiber reinforcement may be present in the compositions and composites of invention in amounts of about 5 to 60 weight percent based on the total weight of the composition depending on the mechanical properties desired.

The compositions and resulting composites which may be modified according to the present invention may contain filler/modifiers (with or without fiber reinforcement) such as glass beads; particulate minerals (e.g. mica, talc, kaolin, clays); flame retardant additives (e.g. decabromodiphenylene oxide (DBDO), antimony trioxide ($Sb_2O_3$), aluminum hydroxide ($Al(OH)_3$)); lubricants, such as polytetrafluoroethylene (PTFE), molybdenum disulfide ($MoS_2$) and graphite powder; bismuth oxides; metal powders, such as tungsten powder; carbon powders; aluminum flakes; magnetic powders, such as barium ferrite; etc.

The fillers may be present in the compositions and composites of the present invention in amounts of about 0.5 to 40 weight percent of the composition depending upon the particular filler and desired use of the filler. All of the above fillers are well known in the art, and appropriate amounts for the intended purpose will be obvious to those skilled in the art.

According to the present invention, fiber reinforced, unreinforced, and/or filled thermoplastic resin compositions having a high flexural modulus may be advantageously modified in their melt integrity characteristics by incorporating about 0.1 to 20 weight percent and preferably about 1 to 4 weight percent of a silicone component which forms interpenetrating polymer networks (IPN's) in the thermoplastic matrix. The formation of such pseudo- or semi-IPN's of silicone in thermoplastic matrices is described in detail in U.S. Pat. Nos. 4,500,688 and 4,714,739, issued to Barry C. Arkles. The disclosures of these U.S. patents are incorporated herein by reference.

In general, the polymerizing silicone phase is made up of two reactive prepolymers: (1) a polymeric silicone which contains silicone hydride (Si-H) groups and (2) a polymeric component which contains unsaturated groups, preferably vinyl groups. Non-limiting examples of other unsaturated groups that can be employed include allyl and hexenyl. Alternatively, both the hydride and unsaturated groups can be part of one polymeric silicone. Still further, the vinyl or other unsaturated group can be on a polymeric silicone compound or on a non-silicone polymer such as a vinyl polymer. These prepolymers are melt-mixed with a thermoplastic matrix resin and reinforcing fibers, and optionally other fillers, in a melt extruder, and the extrudate is pelletized.

A catalyst, generally a platinum complex, is preferably added to the pellets, which are then fed into melt forming apparatus, such as an injection molding machine or extruder, for melt forming. The heat from the forming process triggers a catalyst-induced addition reaction (which may be referred to as vulcanization) between the hydride and vinyl groups of the reactive prepolymers, which results in the interpenetrating polymer network of silicone polymer forming (cross linking and/or chain extending) throughout the fiber reinforced thermoplastic composite.

The ratio of hydride groups to vinyl groups should be about 0.5:1 to 10:1. However, due to stability and compatability problems, such theoretical ratios are sometimes not obtainable in high modulus thermoplastics. For example, with high temperature thermoplastic matrices, such as polyphenylene sulfide, polycarbonates and polysulfones, it is often only possible because of stability problems to use hydride/vinyl ratios of about 1:1 to 1.5:1.

A number of variations of the above are possible, some of which are illustrated in the above patent and pending application. For example, the two reactive prepolymers may be included in separate pellets of the thermoplastic matrix resin, with the catalyst being included in the pellets of one of the prepolymers. Similarly, the reinforcing fibers and other fillers, if present, may be included in either or both types of pellets, but are prefeaably premixed with the thermoplastic matrix resin. The particular order of mixing the various components, consistent with conventional melt processing techniques, is not particularly critical, except that the catalyst (if used) for the silicone component must be isolated or otherwise maintained in an unreactive state until it is desired to initiate the vulcanization of the silicone component during melt-processing (i.e., melt mixing or melt forming).

It has been unexpectedly found that composites formed from the compositions of the present invention exhibit substantially enhanced melt integrity. In particular, as illustrated by the specific, non-limiting examples below, the melt index has been reduced as much as 50 percent or more when a silicone interpenetrating network is incorporated into the high modulus thermoplastic matrix. There is also an increase in melt strength that allows the composite to be melt-drawn to smooth surface, high tolerance profiles which were previously impossible with conventional unmodified thermoplastics.

The greatly enhanced extrudability obtained by the present invention makes the compositions particularly useful for the tubing industry. For example, tubing extruded from compositions of the present invention are easier to process and have a smoother surface appearance. This results in tubing that has a more consistent diameter throughout the entire tubing length.

In addition to the increase in melt strength characteristics described above, compositions of the present invention may exhibit a number of other improved properties, including reduced wear factors (improved wear resistance), reduced shrinkage and warpage, reduced coefficients of friction, enhanced flow modification and mold release, lower void formation (reduced porosity) and lower molded-in stresses, enhanced impact strength and increased heat distortion temperature.

In the following specific examples, composites were formed and tested according to the following general method. Compositions of the invention were melt-mixed in an extruder under standard conditions for the matrix resin. Melt indices were measured on a CSI melt index apparatus at several test conditions. Tubing with a ¼ inch O.D and 0.015–0.020 in wall thickness were extruded on a 1 and ¼ inch diameter Killion single screw extruder. Processability and appearance were noted.

EXAMPLE 1

Polybutylene terephthalate (PBT) composites were prepared and tested as described above. Gafite 1700A (PBT) resin was used as the matrix thermoplastic. The silicone component (IPN) was 20 parts polydimethyldiphenylsiloxane, vinyldimethylsiloxy terminated to 1 part polydimethylsiloxane—30% methylhydrosiloxane copolymer, trimethylsiloxy terminated. The PTFE lubricant powder used was LNP TL-156. The IPN composite was found to exhibit a lower melt flow rate, indicating that the formation of the silicone interpenetrating network affected the melt behavior of the composite. Extrusion trials demonstrated enhanced melt strength which made the composite more extrudable, producing tubing which had a superior surface quality (measured by surface roughness) of constant diameter. The non-IPN composite had a poor surface appearance and considerable breakage was noted.

| Composite | Melt Index at 250° C./5000 g (g/10 min) | Tubing Surface Roughness (Ra) Micron-In/In |
|---|---|---|
| PBT with 15 wt % PTFE lubricant | 59 | 130 |
| PBT with 15 wt % PTFE lubricant and 2 wt % IPN | 31 | 50 |

EXAMPLE 2

Nylon 6,6 composites were prepared and tested as described above. Monsanto Vydyne 66B resin was the nylon 6,6 used. The silicone component (IPN) was 20 parts polydimethylsiloxane, vinyldimethylsiloxy terminated to one part polydimethylsiloxane, 30% methylhydrosiloxane copolymer, trimethylsiloxy terminated. The IPN composite was found to exhibit a lower melt flow rate, indicating that the formation of the silicone interpenetrating network affected the melt behavior of the composites. Extrusion trials demonstrated enhanced melt strength which made the composite more extrudable, producing tubing which had a superior surface quality of constant diameter.

| Composite | Melt Index at 275° C./1200 g (g/10 min) | Tubing Surface Roughness (Ra) Micron-In/In |
|---|---|---|
| nylon 6,6 PTFE lubricant | 12.5 | 125 |
| nylon 6,6 with 2 wt % IPN | 7.6 | 30 |

EXAMPLE 3

Polyacetal (Celcon U-10) composites were prepared and tested as described above. The PTFE lubricant powder was LNP TL-156. The silicone component (IPN) was one part polydimethylsiloxane, vinyldimethylsiloxy terminated to one part polydimethylsiloxane, methylhydrosiloxyl copolymer, trimethylosiloxy terminated. As in the previous examples, the IPN containing composite exhibited enhanced melt strength as well as surface quality of the tubing.

| Composite | Melt Index at 190° C./5000 g (g/10 min) | Tubing Surface Roughness (Ra) Micron-In/In |
|---|---|---|
| Polyacetal with 15 wt % PTFE | 21.3 | 350 |
| Polyacetal with 15 wt % PTFE lubricant powder, and 2 wt % IPN | 19.2 | 225 |

It will be recognized by those skilled in the art that changes may be made to the abovedescribed embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

We claim:

1. A method of improving melt integrity in a thermoplastic molding resin having an unfilled flexural modulus greater than 90,000 psi, comprising adding to said thermoplastic resin prior to or during thermoplastic melt processing a silicone component which will be vulcanized by the reaction of a hydride-containing silicone within said thermoplastic resin to form a silicone semiinterpenetrating polymer network, initiating the vulcanization of said silicone component by thermoplastic melt processing of said component within said thermoplastic resin, extruding said thermoplastic resin, and melt-drawing the resin to a high tolerance profile part.

2. A method according to claim 1 wherein said thermoplastic resin is selected from the group consisting of polyamides, polycarbonates, polystyrene, styrene-acrylonitrile copolymers, acrylonitrile-styrene-butadiene copolymers, polyacetals, polyolefins, polyesters, polysulfones, polyphenylene sulfides, fluoropolymers, polyetherimides, polyether ketones, polyacrylics, polyamide-imides, and polyvinyl chloride.

3. A method according to claim 1 wherein said resin contains a fibrous reinforcing agent selected from the group consisting of glass, carbon, aramid, ceramic, boron, metal, and reinforcing mineral fibers other than glass and ceramic fibers.

4. A method according to claim 3 wherein said fibers are present in an amount of about 5 to 60 weight percent of the composition.

5. A method according to claim 1 wherein said resin contains a modifier selected from the group consisting of glass beads, particulate minerals, flame retardant additives, lubricants, bismuth salts, metal powders, carbon powders, aluminum flakes, and magnetic powders.

6. A method according to claim 5 wherein said modifier is present in an amount of about 0.5 to 40 weight percent of the composition.

7. A method according to claim 1 wherein said network comprises about 0.1 to 20 weight percent of the total composition.

8. A method according to claim 1 wherein said network comprises the reaction product of a polymeric hydride group-containing silicone and a polymer containing at least one unsaturated group.

9. A method according to claim 8 wherein said unsaturated group comprises a vinyl group.

10. A method according to claim 9 wherein the vinyl group is on a polymeric silicone compound.

11. A method according to claim 9 wherein the vinyl group is on a vinyl polymer.

12. A high tolerance profile part produced according to the method of claim 1.

13. A thin-walled tubing produced according to the method of claim 1.

14. A thermoplastic wire produced according to the method of claim 1.

15. A thermoplastic coating produced according to the method of claim 1.

16. A thermoplastic film produced according to the method of claim 1.

17. A method according to claim 8 wherein said reaction is catalyzed by a platinum catalyst.

18. A method according to claim 1, wherein said part comprises thin-walled tubing.

19. A method according to claim 1, wherein said part comprises wire.

20. A method according to claim 1, wherein said part comprises a coating.

21. A method according to claim 1, wherein said part comprises a film.

* * * * *